United States Patent
Bettiol et al.

(10) Patent No.: US 11,963,472 B2
(45) Date of Patent: Apr. 23, 2024

(54) ELECTRODE ARRANGEMENT FOR ELIMINATING WEEDS BY CONTACT ELECTROCUTION

(71) Applicant: AGRITECH S.A., Cordoba (AR)

(72) Inventors: Ariel Alejandro Bettiol, Cordoba (AR); Carlos Juan Torre, Cordoba (AR); Javier Alberto Fuentes, Cordoba (AR); Pedro Ignacio Torre, Cordoba (AR)

(73) Assignee: AGRITECH S.A., Cordoba (AR)

( * ) Notice: Subject to any disclaimer, the term of this patent is extended or adjusted under 35 U.S.C. 154(b) by 197 days.

(21) Appl. No.: 17/619,810

(22) PCT Filed: Jun. 17, 2020

(86) PCT No.: PCT/US2020/038076
§ 371 (c)(1),
(2) Date: Dec. 16, 2021

(87) PCT Pub. No.: WO2020/257241
PCT Pub. Date: Dec. 24, 2020

(65) Prior Publication Data
US 2022/0295684 A1     Sep. 22, 2022

(30) Foreign Application Priority Data
Jun. 18, 2019 (AR) .................................. P190101669

(51) Int. Cl.
*A01M 21/04*      (2006.01)
*A01B 47/00*      (2006.01)
*H01G 11/24*      (2013.01)

(52) U.S. Cl.
CPC ........... *A01B 47/00* (2013.01); *A01M 21/046* (2013.01); *H01G 11/24* (2013.01)

(58) Field of Classification Search
CPC ...... A01M 21/046; A01B 47/00; A01B 39/18; H01G 11/24
(Continued)

(56) References Cited

U.S. PATENT DOCUMENTS

| 492,635 A | 2/1893 | Sharp |
| 546,682 A | 9/1895 | Scheible |

(Continued)

FOREIGN PATENT DOCUMENTS

| DE | 3804052 A1 | 8/1989 |
| EP | 1098563 A1 | 5/2001 |

(Continued)

OTHER PUBLICATIONS

YouTube—"Fundamentals of electric weed control," uploaded May 14, 2019 by Bfhhafl. Retrieved from: <https://www.youtube.com/watch?v=jzRvmd6Uwj4>.
(Continued)

*Primary Examiner* — Monica L Perry
*Assistant Examiner* — Katherine Anne Kloecker
(74) *Attorney, Agent, or Firm* — Volpe Koenig

(57) ABSTRACT

An arrangement of electrodes for removing weeds by contact electrocution comprising: —a general support (1) formed by a first connection means (2) associated with the proximal end of a deformable frame (3), and a first mounting means (5); —a first electrode support (8) associated with said general support (1) by said first connection means (2); —a second electrode support (22) associated with said general support (1) by the distal end (4) of said deformable frame (3); wherein said first electrode support (8) includes a first electrode (15); and wherein said second electrode support (22) includes at least one electrode (29).

8 Claims, 3 Drawing Sheets

(58) Field of Classification Search
USPC .......................................................... 47/1.3
See application file for complete search history.

(56) References Cited

U.S. PATENT DOCUMENTS

| | | | |
|---|---|---|---|
| 2,243,891 | A | 6/1941 | Russell et al. |
| 2,558,376 | A | 6/1951 | Opp et al. |
| 2,588,561 | A | 3/1952 | Opp et al. |
| 3,919,806 | A | 11/1975 | Pluenneke et al. |
| 4,047,326 | A | 9/1977 | Tibbs |
| 4,094,095 | A | 6/1978 | Dykes |
| 4,428,150 | A | 1/1984 | Geiersbach et al. |
| 4,917,193 | A | 4/1990 | Ockler |
| 5,054,559 | A | 10/1991 | Paul |
| 5,806,294 | A * | 9/1998 | Strieber .............. A01B 1/065 47/1.3 |
| 6,237,278 | B1 | 5/2001 | Persson et al. |
| 9,907,505 | B2 * | 3/2018 | Scalici .............. A61B 17/3474 |
| 11,266,140 | B2 * | 3/2022 | Kroeger .............. A01M 21/046 |
| 2002/0174638 | A1 | 11/2002 | Borgesen et al. |
| 2006/0265946 | A1 | 11/2006 | Schwager et al. |
| 2018/0325091 | A1 | 11/2018 | Kroeger et al. |
| 2023/0232814 | A1 * | 7/2023 | Diprose .............. A01M 21/046 47/1.3 |

FOREIGN PATENT DOCUMENTS

| | | | |
|---|---|---|---|
| FR | 2492631 | A1 | 4/1982 |
| JP | H8-56548 | A | 3/1996 |
| JP | 3000191 | B2 * | 1/2000 |
| JP | 2002186324 | A | 7/2002 |
| JP | 3606071 | B2 | 1/2005 |
| JP | 3164210 | U | 11/2010 |
| KR | 200191222 | Y1 * | 8/2000 |
| RU | 2289244 | C1 | 12/2006 |
| RU | 2490888 | C1 | 8/2013 |
| WO | 2016028506 | A1 | 2/2016 |
| WO | 2016162667 | A1 | 10/2016 |
| WO | 2018050138 | A1 | 3/2018 |
| WO | 2018050142 | A1 | 3/2018 |
| WO | 2018095450 | A1 | 5/2018 |
| WO | 2018095451 | A1 | 5/2018 |
| WO | 2019052591 | A1 | 3/2019 |

OTHER PUBLICATIONS

YouTube—"The Weed Zapper Annihilator," uploaded Jan. 26, 2018 by The Weed Zapper. Retrieved from: <https://www.youtube.com/watch?v=NhSUqiZpWxc&t=4s>.

YouTube—"2018 Cab Cam—Zapping Weeds with Jonathan Kramer, Madison County," uploaded Jul. 11, 2018 by Ohio Ag Net & Ohio's Country Journal. Retrieved from: <https://www.youtube.com/watch?v=gTSn8gDEheY>.

YouTube—"Aplicação do Eletroherb em área," uploaded May 17, 2017 by Zasso Group. Retrieved from: <https://www.youtube.com/watch?v=B012sJAsVYc>.

YouTube—"Capina Elétrica. O fim dos herbicidas," uploaded Oct. 12, 2017 by Idolindo. Retrieved from: <https://www.youtube.com/watch?v=WY_i_uQYKXo>.

YouTube—"Lasco Lightning Weeder," uploaded Aug. 23, 2013 by viper1027. Retrieved from: <https://www.youtube.com/watch?v=sDzpC9GI034>.

"Lightning Weeder: Kills Weeds With Electricity," Farm Show Magazine, vol. 5, Iss.2, p. 21 May 1, 1981. Retrieved from: <https://www.farmshow.com/a_article.php?aid=345>.

* cited by examiner

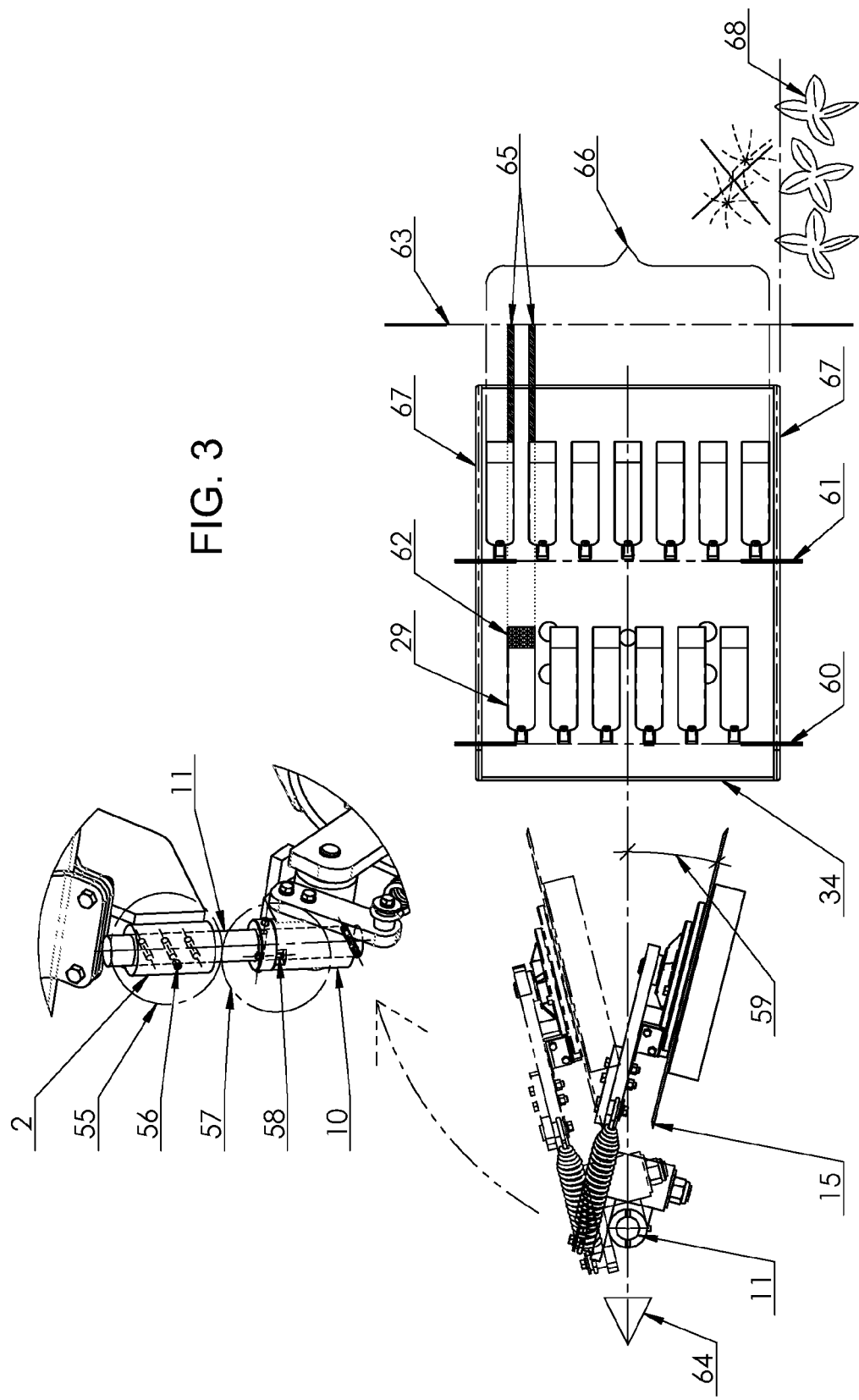

ELECTRODE ARRANGEMENT FOR ELIMINATING WEEDS BY CONTACT ELECTROCUTION

CROSS REFERENCE TO RELATED APPLICATIONS

The present application claims benefit of Argentinian Patent Application No. AR P190101669, filed Jun. 18, 2019, the entire contents of which are incorporated by reference herein as if fully set forth.

FIELD OF THE INVENTION

This invention is directed to an arrangement of electrodes for eliminating weeds by contact electrocution, applicable in rural or urban environments, in processes such as land weeding prior to the implantation of crops, emerged crops, or implanted fruit trees; desiccation of implanted crops such as chickpea, potatoes or others; or the maintenance of urban public spaces.

More specifically it refers to an arrangement of electrodes to eliminate weeds, by applying several electrocution methods by direct contact with the plant, in an efficient, selective and safe way for the operator, for preventive use before sowing, or as a palliative during any stage of crop growth, and adaptable to rural or urban application environments.

BACKGROUND

Currently, the management, control, or elimination of grass weeds or weeds in agricultural and urban systems have different eradication or mitigation methods available based on each need, which in general are complementary: physical extraction methods, cultural methods, chemical methods, through the use of herbicides, biological methods, and some other unconventional methods.

Of particular interest is the rise and boom of agrochemicals, particularly herbicides, due to the success they have shown in the increased agricultural production in developed countries, throughout the second half of the last century.

Interestingly, that same initial success that promoted changes in agricultural systems currently jeopardizes the sustainability of agricultural production, particularly due to the emergence of tolerance or resistance phenomena developed in some weed species to different groups of herbicides. Tolerance promotes the increase of the doses applied to a level that can lead to toxicity in the culture, affectation of the biota, and contamination of the aquifers; of note, said increase in the doses is not consistent with a proportional increase of the expected results. On the other hand, the appearance of species resistant to different groups of herbicides results in an even greater problem, since, although the applied doses are increased, weed control is not achieved.

One of the main disadvantages of chemical methods of weed management is its selectivity, not that much with regard to the spectrum of plant species that it can attack, but as to the mode of action. Some herbicides attack germinating seeds, but not emerged individuals, while with other herbicides it is the other way around. In many cases they cannot be used after the implantation of the crop, or genetic engineering is required to develop crops resistant to these herbicides.

Considering the inconveniences posed regarding the predominant use of chemical methods for weed control, there is a need to find alternative and complementary solutions, such as plant electrocution, and particularly, the development of an efficient and safe application device.

U.S. Pat. No. 492,635 and U.S. Pat. No. 546,682 disclose weed removal processes by electrocution, or some applicator mechanism.

U.S. Pat. No. 6,237,278B1 discloses a process of weed removal by applying high voltage electrical pulses of short duration, by indirect action, i.e., attacking the non-germinated seeds.

Publication DE3804052A1 discloses a weed removal process through the use of microwaves.

U.S. Pat. No. 3,919,806 discloses a process of weed removal by direct contact with plant matter, in many cases by electrodes equidistant from the ground, such as cathodes in the form of horizontal rods.

U.S. Pat. No. 2,558,376 discloses a weed removal process by means of some substance that favors conduction, such as liquids or ionized gases.

The aforementioned documents are based on issues related to the generation and distribution of electrical energy, or on ways to detect and select the weeds that are to be removed, but fail to disclose constructive steps leading to improve the performance of the devices used.

In all the cases mentioned above, the prototypes that were carried out had several drawbacks that prevented their implementation as reliable, efficient and safe devices for weed control, in addition to having the disadvantage of not adapting well to varying application environments.

Whatever the type of electrical energy used, the effectiveness of the methods of application by direct contact between the electrodes and the plant depends mainly on two factors: an effective contact between one of the electrodes and the living plant matter that is to be removed, and a closed circuit between both electrodes through the plant or soil during the application time period.

The main problem that the implementation of the different methods of plant contact electrocution faces is the general lack of efficiency of the system, mainly due to: the formation of voltaic arcs with the consequent fire risk during the application, the variability of the results, poor selectivity, and the risk of electric shock to the operator. Each of these factors is explained below.

The formation of voltaic arcs is given by a combination of factors that favor its occurrence. On the one hand, a poor geometry of some of the electrodes favors the generation of electrical potential concentrating regions; on the other, a rigid or semi-rigid design of the application system prevents permanent contact of the electrodes with the plant material when traveling through the deformations of the ground. The concurrence between intermittent contacts of the electrodes with respect to the ground, and the presence of potential concentrating regions, can generate an abrupt electric discharge in the form of a voltaic arc, which promotes the ignition of dry plant residues that are found in the soil surface and potential damage to the power generation system.

The variability of the results of the application is manifested in the form of regions of the terrain of different sizes, where the plant matter persists after applying the method, so it can be considered a quantifier of the effectiveness achieved. These regions appear when the electrical circuit is not closed properly due to lack of contact, or when the electrical power required for the discharge is insufficient.

The lack of contact can occur in any of the electrodes, as a result of a poor monitoring of said electrodes through the relief of the ground, the irregular insertion of the electrodes that penetrate the ground, the irregular support of the electrodes that rest on the ground, the entrainment of dry plant debris that interpose between weeds and sliding electrodes, or jams of plant debris between adjacent electrode clusters. It also occurs in those prototypes that use electrodes suspended at some distance from the ground, since only the plants that exceed the level of said electrodes are affected.

On the other hand, insufficient electrical discharge occurs as a result of geometric or constructive deficiencies of the electrodes, due to uneven distributions of the electrical potential. It may also appear after the aforementioned abrupt discharges, due to the recovery time of the electricity generator to produce the necessary threshold voltage again.

Application selectivity refers to the ability of the system to distinguish between the plant matter that is to be removed and the one that is sought to be protected. In the background it is observed that the energized electrodes are exposed to the surrounding environment, which will eliminate any plant with which they come in contact, so they are not safe to apply after the emergence of the crop.

This factor coupled with the fact that in the preceding embodiments either or both electrodes are not electrically insulated from their supports and from the machine in general, causes that the system poses a high life risk for the operator.

There are also other factors that contribute to the increase in the use of electrical and mechanical energy and, consequently, to the low efficiency. An example is unwanted soil tillage along winding paths, due to the absence of sufficient degrees of freedom in the design of the electrode supports when they penetrate the ground, the entrainment of plant debris into sliding electrodes, and wasted energy in each electric discharge in the form of a voltaic arc.

SUMMARY

Therefore, the object of this invention is an arrangement of electrodes for eliminating weeds by contact electrocution characterized in that it comprises:

a general support formed by a first connection means associated with the proximal end of a deformable frame, and a first mounting means;

a first electrode support associated with said general support by said first connection means;

a second electrode support associated with said general support by the distal end of said deformable frame;

wherein said first electrode support includes a first electrode; and wherein said second electrode support includes at least one second electrode.

BRIEF DESCRIPTION OF THE DRAWINGS

FIG. 3 illustrates a bottom view of a preferred embodiment of the arrangement of electrodes for removing weeds by contact electrocution of the invention, where two sectors of electrodes are illustrated, one of said sectors with an enlarged view.

DETAILED DESCRIPTION OF THE PREFERRED EMBODIMENTS

Figure 1:
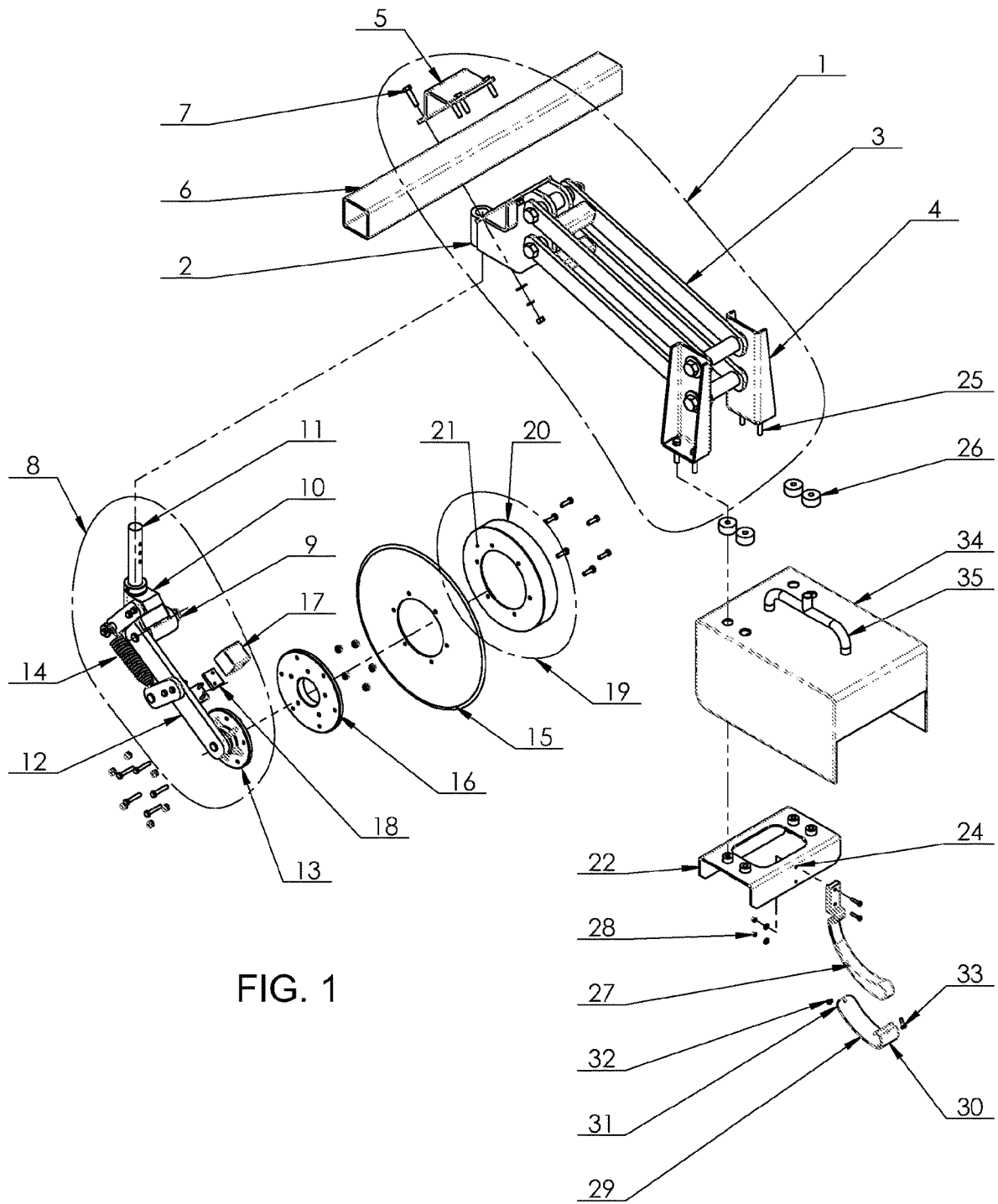
FIG. 1 illustrates an exploded view of a preferred embodiment of the arrangement of electrodes for removing weeds by contact electrocution of the invention.

FIG. 1 illustrates an arrangement of electrodes for removing weeds comprising a general support 1 associated with a coupling means 6 of a housing or chassis of a vehicle (not shown). Said general support 1 is, in turn, associated with a first electrode support and a second electrode support 8, 22. Said general support 1 comprises a first connection means 2, which can be a bushing, an axis or the like, for the assembly of said first electrode support 8, associated with the proximal end of a deformable frame 3, preferably in the form of a parallelogram, at the distal end 4 of which said second electrode support 22 is mounted; and a first mounting means 5, such as flanges, which allow the assembly of the arrangement of electrodes by means of a first fixing means 7 to said coupling means 6 included in the chassis or housing of a vehicle.

Said first electrode support 8 is made up of a first structural part 10 and a second structural part 12 associated with each other by a common axis 9. Between said first structural part 10 and said second structural part 12 there is a first elastic means 14.

Said first structural part 10 consists of a second connection means 11, for example, a bushing coaxial to a rod, which connects said first electrode support 8 to said general support 1 by said first connection means 2. Said second structural part 12 consists of a pivoting arm 12 which pivots, at its proximal end, around said common axis 9, and is constantly pressed down by said first elastic means 14. At the distal end of said pivoting arm 12 a second mounting means 13 is attached, such as a hub, a first insulating element 16, and a first electrode 15. In some cases a penetration depth control means 19 of said first electrode 15 may also be included. Said pivoting arm 12 allows the angular movement of said first electrode 15, and said first elastic means 14 presses said first electrode 15 against the ground on which the vehicle carrying said arrangement of electrodes moves.

Said pivoting arm 12 may take the form of a fork constituted by two arms joined together in an H-shape, which holds said first electrode 15 on both sides.

Preferably, said first electrode 15 takes the form of a smooth agricultural cutting disc, and is insulatingly separated from said second mounting means 13 by said first insulating element 16, so that there is no electrical contact between said first electrode 15 and said general support 8. The electrical connection between said first electrode 15 and an electricity generator (not shown) is achieved by a friction contact by coals housed within a cup 17, mounted on said pivoting arm 12, electrically insulated by an insulating material separating part 18.

Said first electrode 15 may adopt other configurations, such as: a metal wheel that supports on the ground, electrically connected and insulated from said first electrode support 8, and electrically connected to an electricity generator; or a sheet of conductive material that slides on the ground, such as a skate-shaped structure, electrically connected to and insulated from said first insulating element 16 of said first electrode support 15, by suitable fixing means, and electrically connected to a generator of electricity through fixed contacts.

Consequently, said first electrode 15 can adopt other multiple configurations in which there is no penetration into the ground, which would be within the expertise of any average technical expert.

Said penetration depth control 19 can be a leveling wheel integral with said first electrode 15, which comprises a rolling surface 20 of a diameter smaller than the diameter of said first electrode 15, associated with a third mounting means 21, such as a flange, whereby it is connected to said first electrode 15. The combination between said rolling surface 20 and the pressure generated by said first elastic means 14 allows the homogeneous penetration of said first electrode 15 in any suitable ground condition. As previously mentioned, said penetration depth control 19 can adopt other configurations such as, for example, a sliding skate, which would be within the expertise of any average technical expert.

Said second electrode support 22 includes a support means for mounting, by means of a clamping means 28, at least one intermediate part 27 made of insulating and resilient material, associated with at least one second electrode 29. Said second electrode support 22 is associated to the distal end 4 of said deformable frame 3 by a second fixing means 25 and a second insulating element 26 that electrically insulates said second electrode support 22 from said general support 1.

Said at least one second electrode 29 is preferably manufactured from a metal sheet having a curvilinear contact surface 30, with rounded edges and no vertices 31, the geometric characteristics of which are intended to optimize the sliding thereof on the ground, avoid jamming and entrainment of plant matter, evenly distribute the electric field, and minimize the risk of voltaic arc formation. Said at least one second electrode 29 is mounted below said at least one intermediate part 27 by a third fixing means 32, and is associated with said electricity generator through at least one connector 33, so that said at least one second electrode 29 remains electrically insulated from the rest of the arrangement of electrodes.

Yet another form that said at least one second electrode 29 may take is that of a wheel of conductive material, associated with said second electrode support 22, by means of a pivoting means, electrically insulated from said second electrode support 22 by means of an insulating material separating part, associated with said electricity generator.

In turn, said at least one second electrode 29 is electrically insulated from the surrounding environment by means of an insulating frame 34, consisting of an enclosure of surrounding insulating material, with a ventral opening that allows its contact with the ground or plant matter. Said insulating frame 34 prevents involuntary access by the operator to said at least one second electrode 29 when it is energized, and prevents its contact with the vegetation adjacent to the passage of the vehicle carrying the arrangement of electrodes (see FIGS. 2 and 3).

Said second electrode support 22 also includes an anti-fire device 35 (partially visible in FIG. 1 and in greater detail in FIGS. 2 and 3), formed by a fluid distributor conduit that enters through the upper face of said insulating frame 34.

Figure 2:
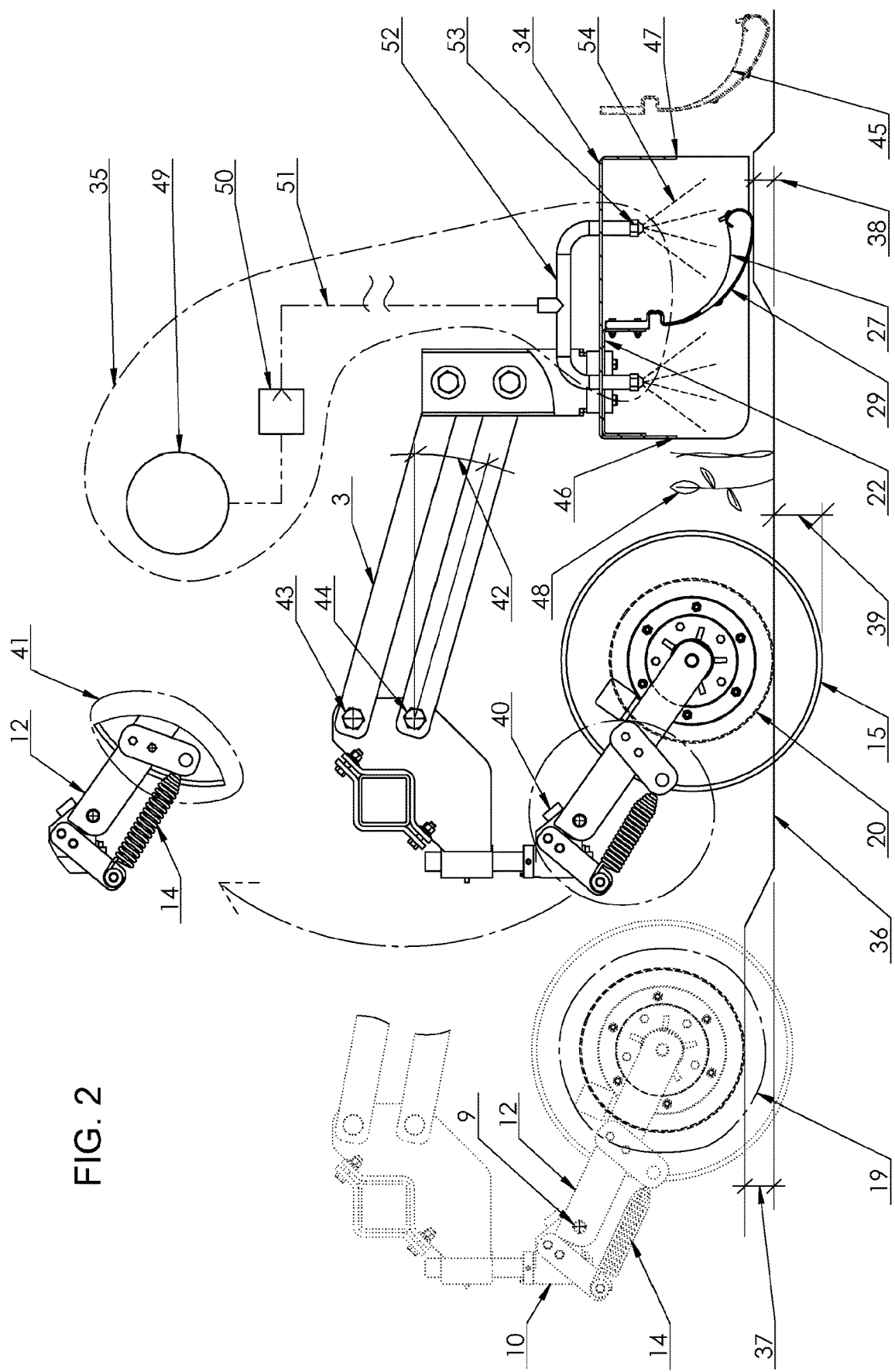
FIG. 2 illustrates a side view of a preferred embodiment of the arrangement of electrodes for removing weeds by contact electrocution of the invention, in the working position.

FIG. 2 illustrates a side view of the arrangement of electrodes in its working position. In said FIG. 2 both the first electrode 15, and the at least one second electrode 29 are seen on a the terrain 36, with a first large slope 37 in a first portion of said terrain 36, and a second small slope 38 in a second portion of said terrain 36. The image of dotted lines to the left represents said first electrode 15 crossing said first slope 37, while the image of dotted lines at the right end represents at least one second electrode in its natural position without deformation.

It can be seen that the angular movement of said pivoting arm 12 and the reaction of said first elastic means 14 favor the permanent support of the rolling surface 20 of said penetration depth control 19 on the ground or plant matter. In this way, the penetration depth 39 of said first electrode 15 is uniform across the deformations of said terrain 36. Likewise, a stop 40 included in said first structural part 10 limits the rotation of said pivoting arm 12 clockwise. On the other hand, the limitation of anti-clockwise rotation of said pivoting arm 12 is determined by the maximum allowable elastic tension of said first elastic means 14. Additionally, said first elastic means 14 may include, at one of its ends, an elastic tension regulating means 41 to thereby achieve uniform penetration of said first electrode 15 in any suitable terrain 36.

The freedom of rotation 42 of said deformable frame 3 can also be observed around pivot axes 43, 44, arranged at its proximal end, allowing the integral movement of said second electrode support 22 to overcome large deformations of the ground, as in the case of said first slope 37. The weight itself attached to the distal end of said deformable frame 3 with respect to said pivot axes 43, 44 serves as sufficient pressure to maintain the contact of said at least one second electrode 29 on said terrain 36.

Still another form of regulating the pressure of the deformable frame 3 can be achieved by a second elastic means (not shown) located between the arms of the parallelogram, or between one of said arms and said general support 1, where at one of the ends of said second elastic means suitable means to regulate the elastic force thereof would be located.

Said at least one intermediate part 27, due to its resilient property, deforms upon crossing said second slope 38, recovering its original position 45 once said second slope 38 has been overcome. Thus, said at least one second electrode 29 slides into contact with the plant matter or the ground, avoiding the formation of dielectrics that favor the generation of voltaic arcs.

The ventral opening of said insulating frame 34 extends on a front surface 46 and on a rear surface 47 thereof to allow the circulation of plant material 48, and its contact with said at least one second electrode 29.

As can be seen, said fire device 35 is composed, more specifically, of a fluid reservoir 49, a fluid impeller 50, both located remotely with respect to the arrangement of electrodes of the invention, and a conduit 51 that connects said fluid impeller 50 with a fluid distributor 52, at thee ends of which spray nozzles 53 are mounted. Said spray nozzles 53 are distributed over an application area and allow generating an anoxic atmosphere 54 within said insulating frame 34, the function of which it is to reduce the concentration of oxygen in the region proximal to said at least one second electrode 29, avoiding ignition of the flammable plant material.

FIG. 3 illustrates a bottom view of the arrangement of electrodes, and includes an enlarged three-dimensional view of the connection between said general support 1 and said first electrode support 8.

A height regulating means 55 of said first electrode support 8 can be observed by combining multiple perforations in said second connection means 11 with a fourth fixing means 56, for example, an elastic pin that crosses said first connection means 2, which also includes multiple perforations. Through this height adjustment it is possible to adapt the arrangement of electrodes of the invention to several vehicle housings or chassis. In addition, a drift limiter 57 of said first electrode 15 can be observed, which is obtained by inserting a locking element 58 in a cavity made in said first structural part 10. Said drift limiter 57 allows the rotation of said first electrode 15 around said second connection means 11 within a turning arc 59 imposed by said locking element 58, so that soil tillage is avoided when the vehicle carrying the arrangement of electrodes of the invention travels along winding paths, reducing the mechanical power consumption and favoring the uniform contact of said first electrode 15 with the terrain 36. As previously mentioned, both said height regulating means 55 and said drift limiter 57 can adopt other configurations which would be within the expertise of any average technical expert.

In this same bottom view, the particular case of a plurality of second electrodes 29 mounted on at least two separate fixing lines 60,61 is shown, wherein said plurality of second [electrodes] 29 are distributed such that the projection of the contact surface 62 of each of said second electrodes 29 on a plane perpendicular 63 to the travel direction 64 of the vehicle, is at least adjacent, and preferably generates an overlapping surface 65 with the contact surface 62 of another of said second electrodes 29, covering in this way the entire effective application surface 66 between the first and the last of the second electrodes 29 of said plurality of second electrodes 29. Around said plurality of second electrodes 29, said insulating frame 34 can be seen, the lateral surface 67 of which prevents contact between said plurality of second electrodes 29 and the foliage of the crop to be protected 68. Obviously, said plurality of second electrodes 29 will be correspondingly associated with a plurality of intermediate parts 27 and a plurality of connectors 33, and is connected to an electricity generator in an equipotential manner.

The invention claimed is:

1. An arrangement of electrodes for eliminating weeds by contact electrocution comprising:
    a general support (1) formed by a first connection means (2) on the proximal end of a deformable frame (3), and connected with a first mounting means (5);
    a first electrode support (8) including a first electrode (15), said first electrode support (8) connected with said general support (1) by said first connection means (2);
    a second electrode support (22) including at least a second electrode (29), said second electrode support (22) connected with said general support (1) by a distal end (4) of said deformable frame (3);
    wherein said first electrode support (8) comprises a first structural part (10) and a second structural part (12) connected with each other by a common axis (9), a first elastic means (14) arranged between said first and second structural parts (10,12),
    said first structural part (10) comprises a second connection means (11) connecting said first electrode support (8) to said general support (1) through said first connection means, and said second structural part (12) consists of a pivoting arm (12) which pivots, at its proximal end, around said common axis (9), and is constantly pressed down by said first elastic means (14), and having mounted, at the distal end of said pivoting arm (12), a second mounting means (13), a first insulating element (16), and said first electrode (15).

2. The arrangement according to claim 1, wherein said pivoting arm (12) is a fork made up of two arms joined together in an H-shape, which holds said first electrode (15) on both sides.

3. The arrangement according to claim 1, wherein said first elastic means (14) includes at one of its ends an elastic tension regulating means (41).

4. The arrangement according to claim 1, wherein said first electrode (15) is isolated from said second mounting means (13) by said first insulating element (16), said first electrode (15) connected electrically to an electricity generator by means of a frictional contact by coals housed inside a cup (17) mounted on said pivoting arm (12), electrically insulated by an insulating material separating part (18).

5. The arrangement according to claim 1,
    wherein said second electrode support (22) further comprises a support means (24) for mounting, by means of a clamping means (28), at least one intermediate part (27) manufactured with insulating and resilient material, connected with said at least one second electrode (29), said second electrode support (22) connected with the distal end (4) of said deformable frame (3) by means of a fixing means (25) and second insulating elements (26) that electrically isolate said second electrode support (22) from said general support (1).

6. The arrangement according to claim 1,
    wherein said at least one second electrode (29) is formed from a metal sheet having a curvilinear contact surface (30), with rounded edges and no vertices (31), and at least one intermediate part (27) is mounted to said at least one second electrode (29) by means of a fixing means (32), and is connected to an electricity generator by means of at least one connector (33).

7. An arrangement of electrodes for eliminating weeds by contact electrocution comprising:
    a general support (1) formed by a first connection means (2) on the proximal end of a deformable frame (3), and a first mounting means (5);
    a first electrode support (8) including a first electrode (15), said first electrode support (8) connected with said general support (1) by said first connection means (2);
    a second electrode support (22) including at least a second electrode (29), said second electrode support (22) connected with said general support (1) by the distal end (4) of said deformable frame (3);
    wherein said second electrode support (22) further comprises a plurality of second electrodes (29) which are mounted on at least two separate fixing lines (60,61) and distributed in such a way that the projection of the contact surface (62) of each of said second electrodes (29) on a plane perpendicular (63) to the travel direction (64) of a vehicle, is at least adjacent, and
    wherein the plurality of second electrodes (29) generate a surface superimposed (65) with the contact surface (62) of another of said second electrodes (29), thereby covering the entire effective application surface (66) between the first and the last of the second electrodes (29) of said plurality of second electrodes (29).

8. The arrangement according to claim 7, wherein said plurality of second electrodes is connected to an electricity generator in an equipotential manner.

* * * * *